(12) United States Patent
Popuri

(10) Patent No.: US 11,575,492 B1
(45) Date of Patent: Feb. 7, 2023

(54) MULTI-RATE FILTERING IN HIGH-SPEED DATA CHANNEL

(71) Applicant: Marvell Asia Pte Ltd, Singapore (SG)

(72) Inventor: Viswakiran Popuri, Milpitas, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/648,626

(22) Filed: Jan. 21, 2022

Related U.S. Application Data

(60) Provisional application No. 63/221,406, filed on Jul. 13, 2021, provisional application No. 63/219,739, filed on Jul. 8, 2021, provisional application No. 63/141,442, filed on Jan. 25, 2021.

(51) Int. Cl.
*H04L 5/02* (2006.01)
*H04B 1/40* (2015.01)
*H04B 7/04* (2017.01)

(52) U.S. Cl.
CPC .............. *H04L 5/02* (2013.01); *H04B 1/40* (2013.01); *H04B 7/04* (2013.01)

(58) Field of Classification Search
CPC ................ H04L 5/02; H04B 1/40; H04B 7/04
See application file for complete search history.

(56) References Cited

U.S. PATENT DOCUMENTS

| | | | | |
|---|---|---|---|---|
| 4,845,746 A | * | 7/1989 | Li ........................ | H04B 3/234 379/406.06 |
| 5,917,809 A | * | 6/1999 | Ribner .................... | H04B 3/23 379/406.06 |
| 7,831,646 B1 | | 11/2010 | Lam et al. | |
| 7,924,912 B1 | * | 4/2011 | Rokhsaz .......... | H04L 25/03057 375/233 |
| 9,838,072 B1 | * | 12/2017 | Dai ................... | H04L 25/03885 |
| 10,171,200 B2 | * | 1/2019 | Yu .......................... | H04J 14/06 |
| 2021/0021448 A1 | * | 1/2021 | Beukema ........... | H04L 25/0272 |

* cited by examiner

Primary Examiner — Sung S Ahn

(57) ABSTRACT

A physical layer transceiver, for connecting a host device to a wireline channel medium in which a signal component occurring at a particular time may cause interference at other times, includes a host interface for coupling to a host device, a line interface for coupling to the channel medium, and filter circuitry operatively coupled to the line interface to filter the interference caused by the signal component at the particular time and at the one or more other times. The filter circuitry includes at least one filter segment configured to operate at a first rate derived from a channel operating frequency to filter the signal component at the particular time, and at least one respective filter segment configured to operate at a respective additional rate different from the first rate. Respective delay elements allow each respective filter segment to filter the signal component at a one of the other times.

20 Claims, 9 Drawing Sheets

MULTI-RATE FILTERING IN HIGH-SPEED DATA CHANNEL

CROSS REFERENCE TO RELATED APPLICATION

This disclosure claims the benefit of commonly-assigned U.S. Provisional Patent Applications Nos. 63/141,442, 63/219,739 and 63/221,406, filed Jan. 25, 2021, Jul. 8, 2021 and Jul. 13, 2021, respectively, each of which is hereby incorporated by reference herein in its respective entirety.

FIELD OF USE

This disclosure relates to the configuration of filters for a high-speed data channel. More particularly, this disclosure relates to the use of filter segments having different rates for different portions of the signal on the channel at different times.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Physical layer (PHY) devices for high-speed wireline serial communications, such as 1000 Base-T or 10G Base-T lines, typically use adaptive filters for equalization, as well as cancellation of echo, crosstalk and/or radiofrequency (RF) interference. A typical adaptive filter may include feed-forward equalizer (FFE) circuitry, echo cancellation (EC) circuitry, near-end crosstalk (NEXT) cancellation circuitry, and/or far-end crosstalk (FEXT) cancellation circuitry. The adaptive filter may have a plurality of taps, with each tap filtering a portion of the signal. The coefficients of each segment are adapted with an algorithm such as, e.g., least-mean-squares, to maximize the effectiveness of the filter circuitry.

Any particular signal portion that first appears at a particular time may appear again at a later time as a form of interference. For example, a signal—particularly a transmitted signal—may be reflected one or more times from the ends of the channel or from some other discontinuity, appearing in attenuated form as an echo, which has to be cancelled. As another example, a received signal representing a symbol may spread temporally into a later symbol, manifesting as interference that has to be equalized by subtraction.

In order to filter out these forms of interference—whether, e.g., by echo cancellation in the former example or by equalization in the latter example—filter segments typically are deployed to cover the entire duration of the interference. That is, in the echo example in, e.g., a transmit channel, echo canceller segments are deployed, using suitable delay lines, throughout the duration during which echoes may occur, to cancel those echoes. Similarly, in the symbol spread example in, e.g., a receive channel, equalizer segments are deployed, using suitable delay lines, throughout the duration during which a symbol may spread temporally. However, providing such filter segments—whether echo cancellers or equalizers—throughout such a duration, may result in significant expense and increased power consumption.

SUMMARY

A physical layer transceiver according to implementations of the subject matter of this disclosure, for connecting a host device to a wireline channel medium in which a signal component occurring at a particular time may cause interference at one or more other times, includes a host interface for coupling to a host device, a line interface for coupling to the wireline channel medium, and filter circuitry operatively coupled to the line interface to filter the interference caused by the signal component at the particular time and at the one or more other times. The filter circuitry includes at least one filter segment configured to operate at a first rate derived from a channel operating frequency to filter the signal component at the particular time, and at least one respective filter segment configured to operate at a respective additional rate different from the first rate, each respective filter segment being coupled to a respective delay element to filter the signal component at a respective one of the one or more other times.

In a first implementation of such a physical layer transceiver, each respective additional rate, at which each respective filter segment is configured to operate, may be slower than the first rate.

According to a first aspect of that first implementation, the at least one respective filter segment configured to operate at a respective additional rate to filter the interference caused by the signal component at a respective one of the one or more later times may include a plurality of respective filter segments configured to operate at respective additional rates to filter the interference caused by the signal component at respective ones of a plurality of other times, and the respective additional rate, at a particular respective one of the plurality of other times that is later than another respective one of the plurality of other times, is slower than the respective additional rate at the another respective one of the plurality of other times.

In a first instance of that first aspect of the first implementation, the plurality of respective filter segments configured to operate at respective additional rates may include only two respective filter segments, a first one of the two respective filter segments may be configured to operate at one-half the first rate, and a second one of the two respective filter segments may be configured to operate at one-quarter the first rate.

In a second instance of that first aspect of the first implementation, the filter circuitry may be coupled to a transmit channel of the line interface to filter interference when the signal component is a transmitted signal component.

In a first variant of that second instance of the first aspect, the filter circuitry may include echo cancellation circuitry configured to cancel an echo of the transmitted signal component.

In a second variant of that second instance of the first aspect, the filter circuitry may include a first path including one filter segment configured to operate at the first rate, a plurality of respective additional paths, each respective additional path including a respective additional filter segment configured to operate at the respective additional rate, and a respective delay corresponding to a respective one of the plurality of other times, and circuitry for combining outputs of the first path and the respective additional paths.

In that variant, each one of the respective additional paths may further include downsampling circuitry upstream of the respective filter additional segment, and upsampling circuitry downstream of the respective filter additional segment.

In a third instance of the first aspect of the first implementation, the filter circuitry may be coupled to a receive channel of the line interface to filter interference when the signal component is a received signal component.

In a first variant of that third instance of the first aspect, the filter circuitry may include equalizer circuitry to filter delayed portions of the received signal component from interfering with a later received signal component.

In a second variant of that third instance of the first aspect, the filter circuitry may include a first path including one filter segment configured to operate at the first rate, a plurality of respective additional paths, where a first one of the plurality of respective additional paths may be cascaded to output of the one filter segment configured to operate at the first rate, and may include a first respective additional filter segment configured to operate at a first respective additional rate, and each subsequent one of the respective additional paths may be cascaded to output of the respective additional filter segment in an immediately preceding one of the respective additional paths, and may include a respective subsequent additional filter segment configured to operate at a further respective additional rate, and circuitry for combining outputs of the first path and the respective additional paths.

In that second variant, each one of the respective additional paths may further include downsampling circuitry upstream of the respective additional filter segment, and upsampling circuitry downstream of the respective additional filter segment.

A method in accordance with implementations of the subject matter of this disclosure for filtering a wireline channel medium, in which a signal component occurring at a particular time may cause interference at one or more other times, includes filtering the signal component on the channel medium at a first rate at the particular time, and filtering the interference caused by the signal component on the channel medium at a respective one of the one or more other times at a respective additional rate different from the first rate.

According to a first aspect of that method, each respective additional rate may be slower than the first rate.

In a first instance of that first aspect, filtering the interference caused by the signal component on the channel medium at a respective one of the one or more other times at a respective additional rate may include filtering the interference caused by the signal component on the channel medium at only two later times, including filtering the interference caused by the signal component on the channel medium at a first later time at one-half the first rate, and filtering the interference caused by the signal component on the channel medium at a second later time at one-quarter the first rate.

In a second instance of that first aspect, filtering the interference caused by the signal component at the respective one of the one or more other times at a respective additional rate may include filtering the interference caused by the signal component at a plurality of respective other times at a plurality of respective additional rates, and the respective additional rate, at a particular respective one of the plurality of other times that is later than another respective one of the plurality of other times, may be slower than the respective additional rate at the another respective one of the plurality of other times.

In a first variant of that second instance, filtering the signal component on the channel medium may include filtering a transmit component, by filtering a first path at the first rate, delaying each of a plurality of respective additional paths by a respective delay corresponding to a respective one of the plurality of other times, filtering each of the plurality of the delayed respective additional paths by a respective additional rate, and combining outputs of the first path and the respective additional paths.

That first variant may further include downsampling each respective one of the plurality of respective additional paths prior to the filtering, and upsampling each respective one of the plurality of respective additional paths following the filtering and prior to the combining.

In a second variant of the second instance, filtering the signal component on the channel medium may include filtering a receive component, by filtering a first path at the first rate, cascading a first one of a plurality of respective additional paths to output of the filtering of the first path at the first rate, and filtering the first one of a plurality of respective additional paths at a first respective additional rate, cascading each subsequent one of the respective additional paths to output of the respective additional filter segment in an immediately preceding one of the respective additional paths, and filtering each respective subsequent one of the plurality of respective additional paths at a further respective additional rate, and combining outputs of the first path and the respective additional paths.

That second variant may further include downsampling each respective one of the plurality of respective additional paths prior to the filtering of the respective one of the plurality of respective additional paths, and upsampling each respective one of the plurality of respective additional paths following the filtering of the respective one of the plurality of respective additional paths and prior to the combining.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
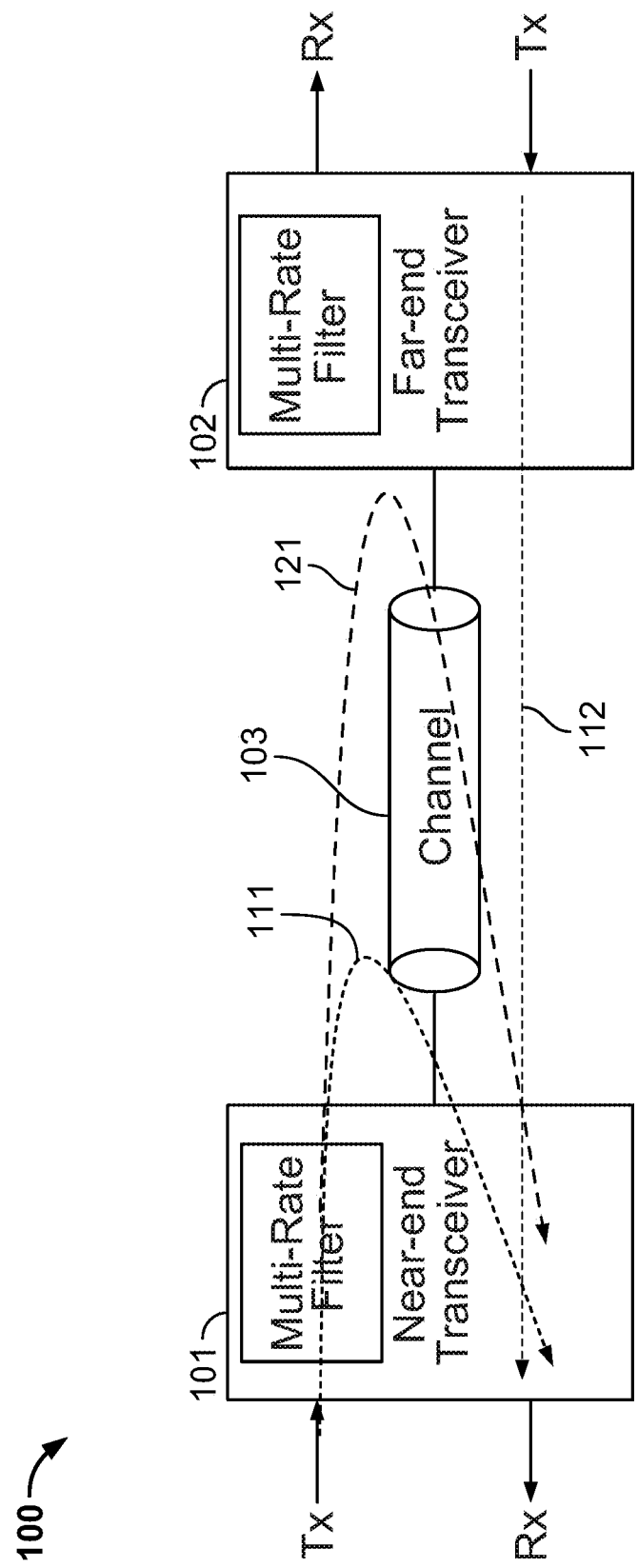
FIG. 1 is a representation of a wireline communications link, such as an Ethernet physical link, in which implementations of the subject matter of this disclosure may be used, and showing echo signals to be cancelled.

As noted above, because filter segments such as echo cancellers and equalizers are relatively expensive, and consume relatively large amounts of power, there are costs to providing sufficient filter segments to cover the entire temporal duration of interference on a link. For example, if echoes continue to occur without cancellation, they may interfere with later signals on the link. Similarly, if a received symbol spreads into later symbols, it may adversely impact the decoding of those later symbols.

Therefore, in accordance with implementations of the subject matter of this disclosure, filter segments are provided for the full temporal duration of interference. However, taking advantage of the inherent low-pass filtering characteristics of a data channel (particularly a wireline data channel), implementations of the subject matter of this disclosure provide filter segments operating at progressively lower rates at later times. Slower filters are less expensive (in terms of both cost and device area) and consume less power, reducing costs of filtering the entire temporal duration of an interference event. Moreover, the number of slower filters needed is smaller than the number of full-rate filters that would have been needed, because a lower-rate filter covers a longer duration. Thus, not only does each filter consume less power, but there are fewer filters needed than if only full-rate filters were used, further reducing overall power consumption.

In some implementations, the channel may be measured to determine the frequency components of the interference in each temporal segment, and the filter rate of each filter segment can be adjusted accordingly. In other implementations, however, initial temporal segments can be filtered at a base rate of the channel, and simple divide-by-2 circuitry can be used to divide the base rate of the channel to provide half-rate filters for intermediate temporal segments, and quarter-rate filters for later temporal segments.

Filter segments may be deployed to different temporal segments using appropriate delay lines. For example, in the case of echo canceller segments in a transmit channel, the frequency composition of the transmitted signal is known, and therefore the channel can be split into, e.g., three sub-channels. One sub-channel may be filtered by a full-rate filter (e.g., a full-rate echo canceller). A second sub-channel may be filtered by a half-rate filter (e.g., a half-rate echo canceller). A third sub-channel may be filtered by a quarter-rate filter (e.g., a quarter-rate echo canceller). In such an implementation, the first sub-channel would include no delay line, and would filter received echoes of transmitted signals (e.g., caused by near-end discontinuities, so arriving early) at the full channel rate. The second sub-channel would include a delay line that substantially matches the delay to a later-received echo of the original transmitted signal, and would filter echoes of the transmitted signals (e.g., caused by a reflection from the far end, and therefore arriving after a first delay) at one-half of the full channel rate. The third sub-channel would include a delay line that substantially matches the delay to a still later echo signal, and would filter echoes of transmitted signals (e.g., caused by bounce-back of the first reflected signal, and therefore arriving after a second, longer delay) at one-quarter of the full channel rate.

In order to be operated on by the lower rate filters, the signal may downsampled (e.g., decimated) to the lower rate. After filtering, the filtered signals may be upsampled (e.g., interpolated) to the original rate so that the sub-channels can be recombined. Thus, the sub-channel to be filtered at the half rate may be downsampled by a factor of two and, after filtering, may be upsampled by a factor of two. Similarly, the sub-channel to be filtered at the quarter rate may be downsampled by a factor of four and, after filtering, may be upsampled by a factor of four.

As another example, in the case of equalization segments in a receive channel, the frequency composition is not known ahead of time. Therefore, the different filters may be chained to provide the different sub-channels. Thus, the signal may be filtered by a full-rate filter (e.g., a full-rate equalizer) whose output may be one sub-channel. The output of the full-rate filter may also be downsampled (e.g., decimated) by, e.g., a factor of 2 and then may be filtered by a half-rate filter (e.g., a half-rate equalizer). The output of the half-rate filter may then be upsampled (e.g., interpolated) by a factor of 2 for combining with the output of the full-rate filter. The output of the half-rate filter also may be further downsampled (e.g., decimated) by a further factor of 2 and then may be filtered by a quarter-rate filter (e.g., a quarter-rate equalizer). The output of the quarter-rate filter may then be upsampled (e.g., interpolated) by a factor of 4 for combining with the output of the full-rate filter and the upsampled output of the half-rate filter.

In such an implementation, there would be no delay line before the full-rate filter, which would filter from the current received symbol temporally spread components of earlier received symbols. The full rate filter would also serve as a delay for the current received symbol so that the output of the full-rate filter that is input to the half-rate filter is already delayed to correspond to portions of the current symbol that are spread into a subsequent symbol. Similarly, the half-rate filter would serve as a further delay to correspond to portions of the current symbol that are spread into still later symbols. Alternatively, some additional delay may be inserted as needed between the full-rate filter and the half-rate filter or between the half-rate filter and the quarter-rate filter.

The subject matter of this disclosure may be better understood by reference to FIGS. 1-9.

FIGS. 1-4 illustrate echo cancellation in accordance with implementations of the subject matter of this disclosure.

FIG. 1 is a representation of a wireline communications link 100, such as an Ethernet physical link, including a transceiver 101, which may be designated for discussion purposes as the "near-end" transceiver from which the signal in question is transmitted, and a transceiver 102 which may be designated as the far-end transceiver to which the signal in question is transmitted. Link 100 also includes a channel medium 103, such as a coaxial cable or one or more twisted wire pairs (shielded or unshielded). All of the filtering discussed herein occurs at the "near end," from which the signal in question is transmitted in the described implementation, but for purposes of signals originating at what is designated the "far end," that end serves as the "near end" and similar filtering may be performed from the perspective of that end.

As seen in FIG. 1, near-end transceiver 101 receives a signal 112 from far-end transceiver 102. However, near-end transceiver 101 also receives a near-end reflection signal 111 which is a reflection of a signal (not shown) transmitted by near-end transceiver 101 onto channel medium 103 but reflected back by a relatively near discontinuity, such as, e.g., a connector (not shown) with which cable 103 is coupled to near-end transceiver 101, or a bend or kink in channel medium 103 close to near-end transceiver 101. Near-end transceiver 101 further receives a far-end reflection signal 121 which is a reflection of the signal transmitted by near-end transceiver 101 onto channel medium 103 but reflected back by a relatively far discontinuity, such as, e.g., a connector (not shown) with which channel medium 103 is coupled to far-end transceiver 102, or a bend or kink in cable 103 close to far-end transceiver 102. If reflection signal 121 has sufficient amplitude, it may continue to bounce back and forth between the ends of the channel medium, resulting in additional reflection signals received at near-end transceiver 101. These reflection signals have to be cancelled to clearly decode received signal 112.

Figure 2:
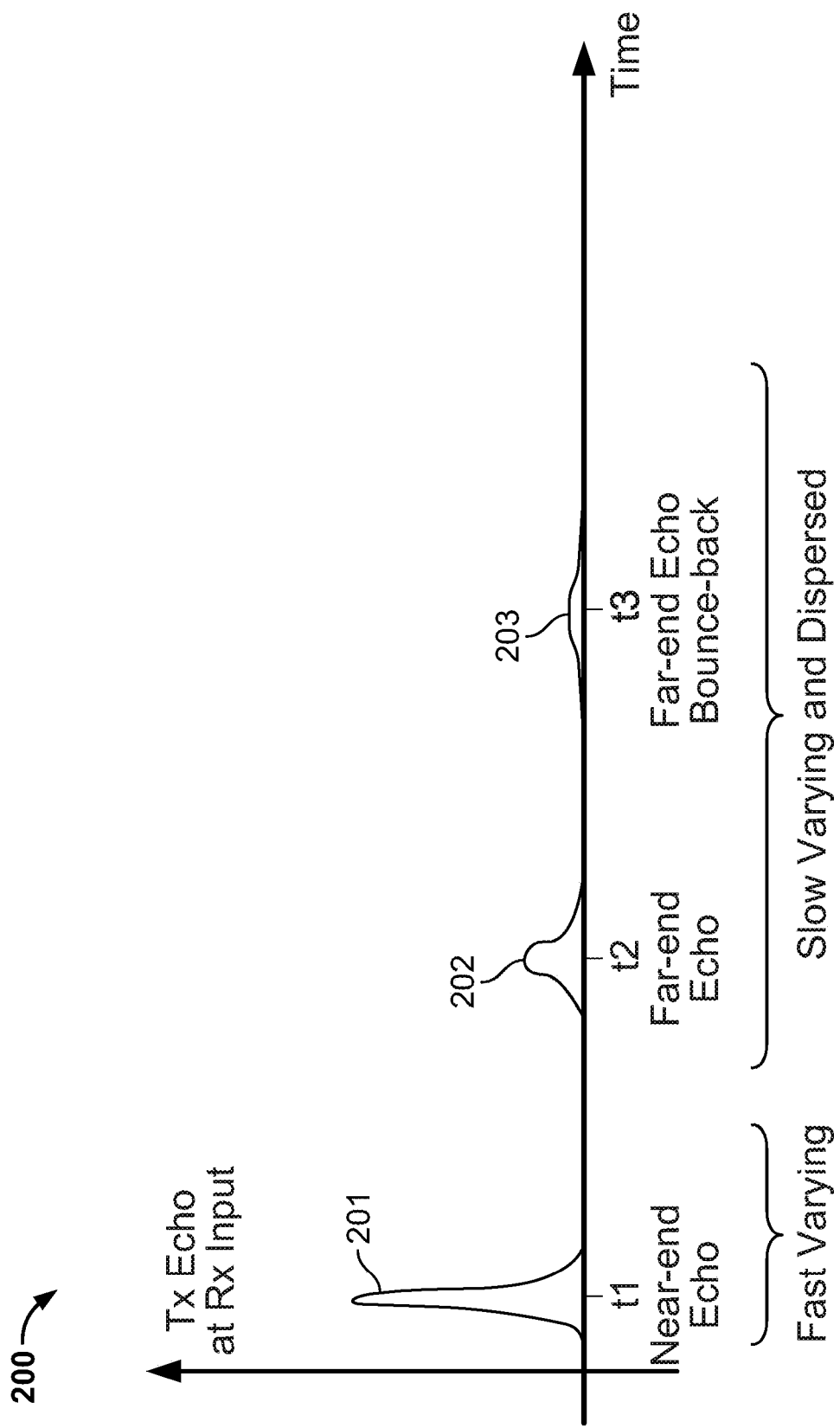
FIG. 2 is a graphical representation of the effect of the passage of time on an echo signal on a wireline communications link such as the wireline communications link of FIG. 1.

FIG. 2 is a plot 200 of the magnitude of a single echo pulse received at different times in the same place (e.g., at near-end transceiver 101). Pulse 201 at time $t_1$ may represent the first time a particular transmitted signal is reflected back to near-end transceiver 101. As a reflection from a near-end discontinuity such as a connector near near-end transceiver 101, pulse 201 will not have traveled far along channel medium 103, and still includes many frequency components including fast-varying frequency components, producing a relatively high sharp peak.

Later, at time $t_2$, the same pulse may be received again at near-end transceiver 101, after having traveled as much as the full length of channel medium 103 and been reflected back, thus potentially having traversed the entire channel medium 103 twice. The channel impedance forms a natural low-pass filter, and therefore by time $t_2$, pulse 202 has lost many of the higher-frequency components, having a lower amplitude and being dispersed in time (as indicated by the pulse width).

As mentioned above, the signal may continue to bounce back and forth along channel medium 103 before decaying to an undetectable amplitude, and thus at time $t_3$, the signal may be detected again at near-end transceiver 101 as pulse 203 which has lost even more of its higher-frequency components, having an even lower amplitude and being dispersed further in time.

Instead of deploying identical filters (which necessarily would all be capable of filtering the highest-frequency components that may be present in any of the reflected pulses 201, 202, 203), in accordance with implementations of the subject matter of this disclosure, different filters are deployed to the temporal locations (in this case $t_1$, $t_2$, and $t_3$) of the different pulses 201, 202, 203. Each of the different filters is configured to more closely correspond to the frequency components found in the respective pulses. The temporal locations are determined by interspersing appropriate delay elements in the filter arrangement.

Figure 3:
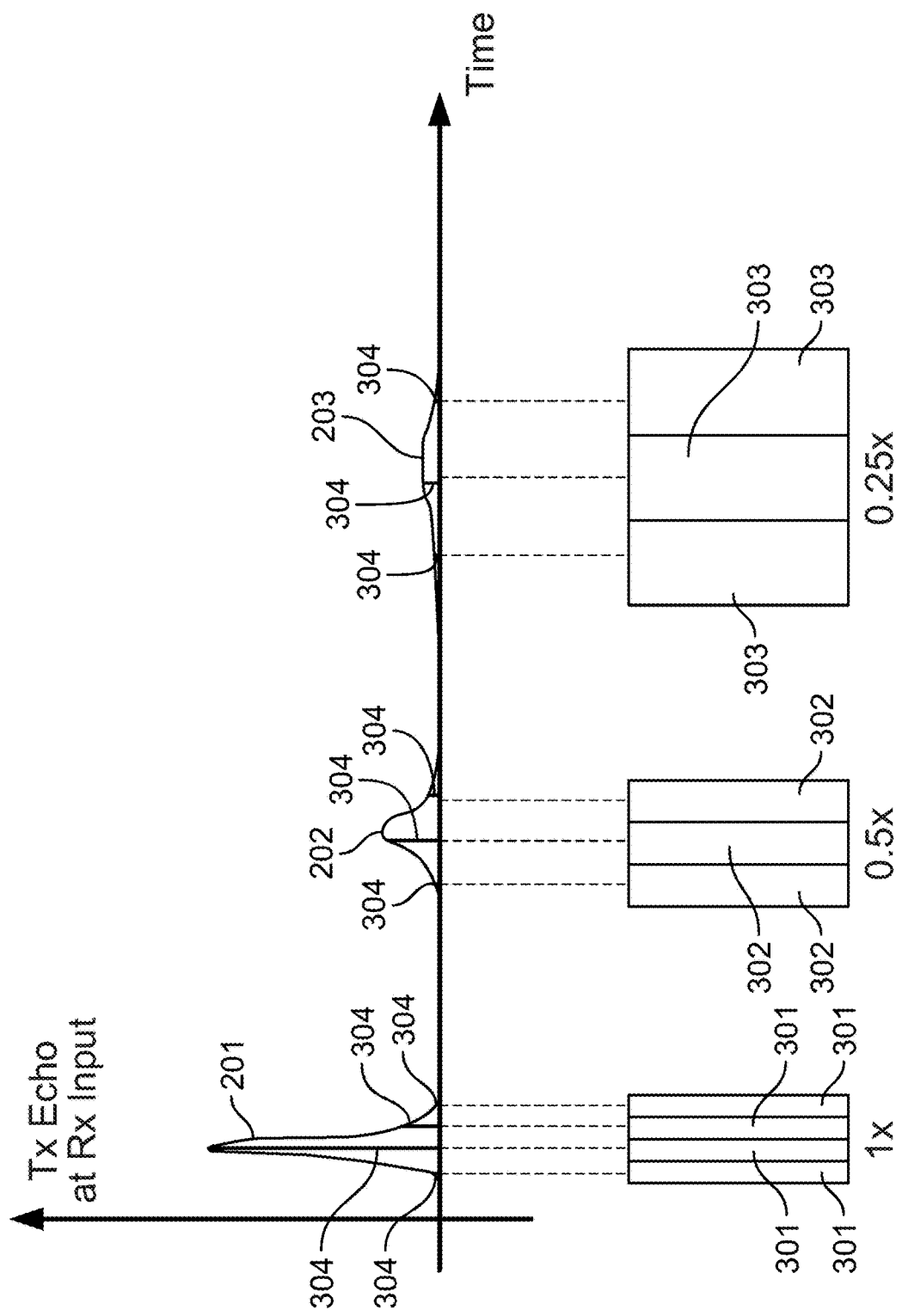
FIG. 3 shows a distribution of echo cancellation filter segments, relative to the echo signal of FIG. 2, in accordance with implementations of the subject matter of this disclosure.

As seen in FIG. 3, four filter segments 301 are deployed to the temporal interval covered by pulse 201 for echo cancellation. As indicated by the label "1×," each filter segment 301 is a "full-rate" filter configured to filter signals at the system frequency. Three filter segments 302 are deployed to the temporal interval covered by pulse 202. As indicated by the label "0.5×," each filter segment 302 is a "half-rate" filter configured to filter signals at one-half the system frequency and, as shown, covers twice the duration of a full-rate filter. Three filter segments 303 are deployed to the temporal interval covered by pulse 203. As indicated by the label "0.25×," each filter segment 303 is a "quarter-rate" filter configured to filter signals at one-quarter the system frequency and, as shown, covers four times the duration of a full-rate filter.

In many implementations, the slower filter segments 302 and 303 consume less power and device area than filter segments 301. Filter segments 302 and 303 are configured for half-rate and quarter-rate operation because it is relatively straightforward to use a series of divide-by-2 circuits to divide the system clock in half and then in half again. Using half-rate filters and quarter-rate filters is sufficient to improve signal-to-noise ratio on the channel without using more expensive full-rate filter segments 301 throughout the duration of the interference, even though the frequency of filter segments 302 and 303 may not exactly match the frequency components of pulses 202 and 203, respectively.

In alternative implementations, filter segments 302 and 303 may be more closely matched to the actual frequency composition of pulses 202, 203. However, such implementations would require detectors capable of analyzing the frequency of the interference pulses, as well as filters whose frequency of operation is capable of being adjusted.

Regardless of its frequency of operation, each filter segment 301, 302, 303 provides a cancellation signal 304 having an amplitude appropriate to cancel an amount of interference in the temporal interval covered by the respective filter segment, at the respective frequency of the filter. For ease of illustration, each cancellation signal 304 is shown as a positive signal to show the amplitude match, but in practice the signal would have a negative amplitude to cancel the corresponding interference signal.

Figure 4:
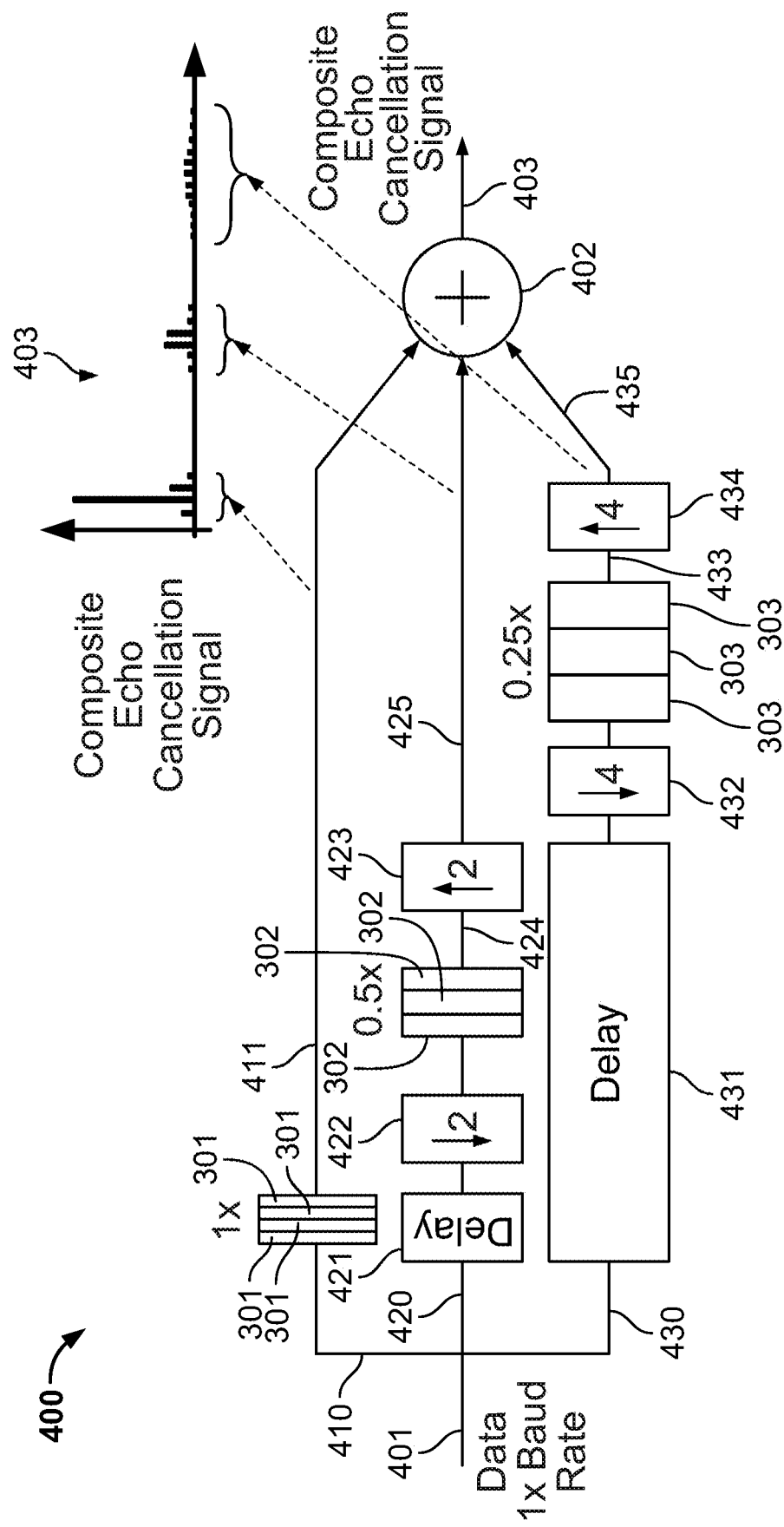
FIG. 4 shows a high-level circuit arrangement of the filter distribution of FIG. 3 in accordance with implementations of the subject matter of this disclosure.

FIG. 4 shows, in simplified form, a circuit implementation 400 of the echo cancellation filter arrangement of FIG. 3. The data signal from which echoes are to be filtered may be input at 401 and split into three paths 410, 420, 430. Filter segments 301 are deployed in signal path 410 to filter pulse 201 (the number of filter segments will vary depending on the nature of the particular channel being filtered, and generally will appear in greater numbers than are shown here for illustration).

Filter segments 302 are deployed in signal path 420, preceded by a delay element 421, sufficient to account for the delay to pulse 202. Because filter segments 302 operate at one-half of the system frequency, downsampling circuitry 422 downsamples the signal on path 420 by a factor of 2 (e.g., by decimation) upstream of filter segments 302. After filtering by filter segments 302, filtered signals 424 are upsampled by a factor of 2 (e.g., by interpolation) by upsampling circuitry 423, back to the system frequency so that upsampled filtered signals 425 can be recombined at 402 with filtered signals 411 on path 410 (as well as upsampled filtered signals 435 on path 430).

Filter segments 303 are deployed in signal path 430, preceded by a delay element 431, sufficient to account for the delay to pulse 203. Because filter segments 303 operate at one-quarter of the system frequency, downsampling circuitry 432 downsamples the signal on path 430 by a factor of 4 (e.g., by decimation) upstream of filter segments 303. After filtering by filter segments 303, filtered signals 433 are upsampled by a factor of 4 (e.g., by interpolation) by upsampling circuitry 434, back to the system frequency so that filtered signals 435 can be recombined at 402 with filtered signals 411 on path 410 (as well as upsampled filtered signals 425 on path 420).

Details of composite echo cancellation signal 403 are shown in the inset in the upper right-hand portion of FIG. 4, and correspond to the cancellation signals 304 shown in FIG. 3. Again, only the absolute values of cancellation signals 304 are shown. Composite echo cancellation signal 403 may be subtracted from input signal 401 to remove echo pulses 201, 202, 203, and thus the signs would be opposite to what is shown.

Although FIGS. 2-4 show a single set of reflections at times $t_1$, $t_2$ and $t_3$ from a single original pulse, it should be recognized that other transmitted pulses are generating other reflections. Thus at time $t_1$ when the first reflection occurs, there may also be a second or third reflection from a previous transmitted pulse or pulses. It also is possible that there may be more than one reflection per pulse, although attenuation in channel medium 103 makes that less likely. However, because of the overlap of reflections from different transmitted pulses, there may be multiple parallel iterations of the echo cancellation circuitry of FIGS. 2-4.

Figure 5:
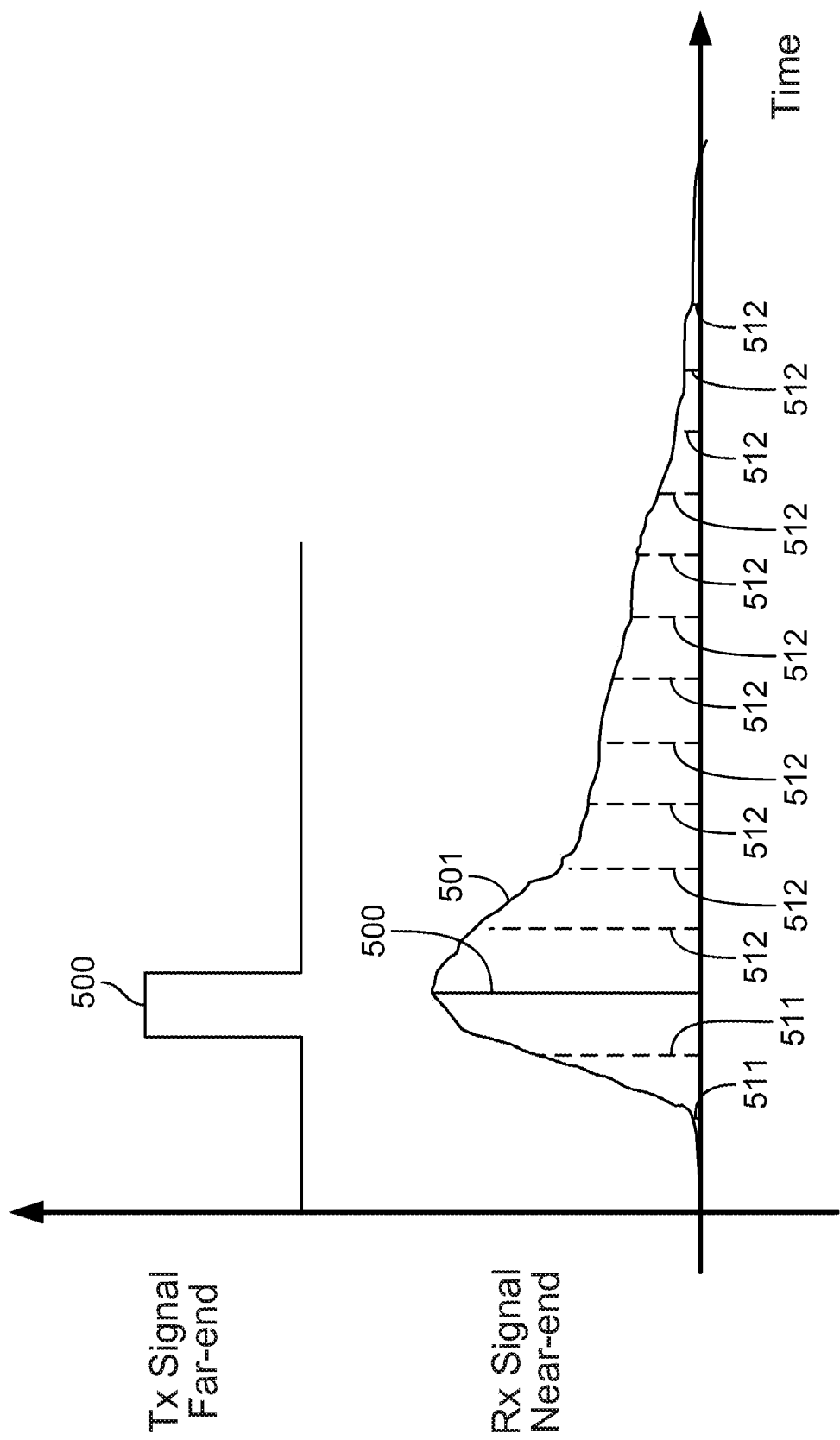
FIG. 5 shows the effect of the passage of time in spreading a signal, thereby requiring equalization, in a wireline communications link such as the wireline communications link of FIG. 1.
Figure 6:
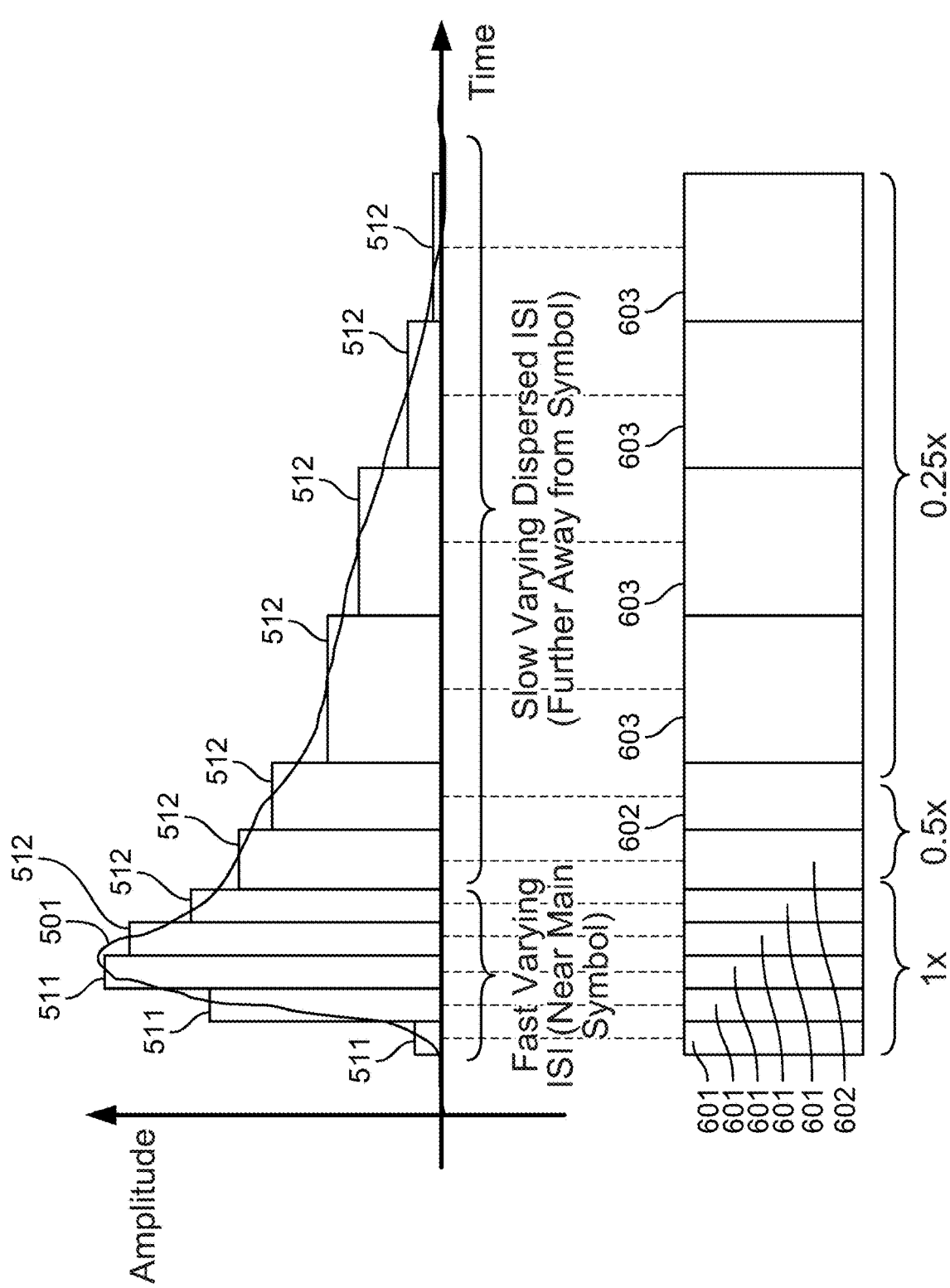
FIG. 6 shows a distribution of equalizer filter segments, relative to the signal of FIG. 5, in accordance with implementations of the subject matter of this disclosure.
Figure 7:
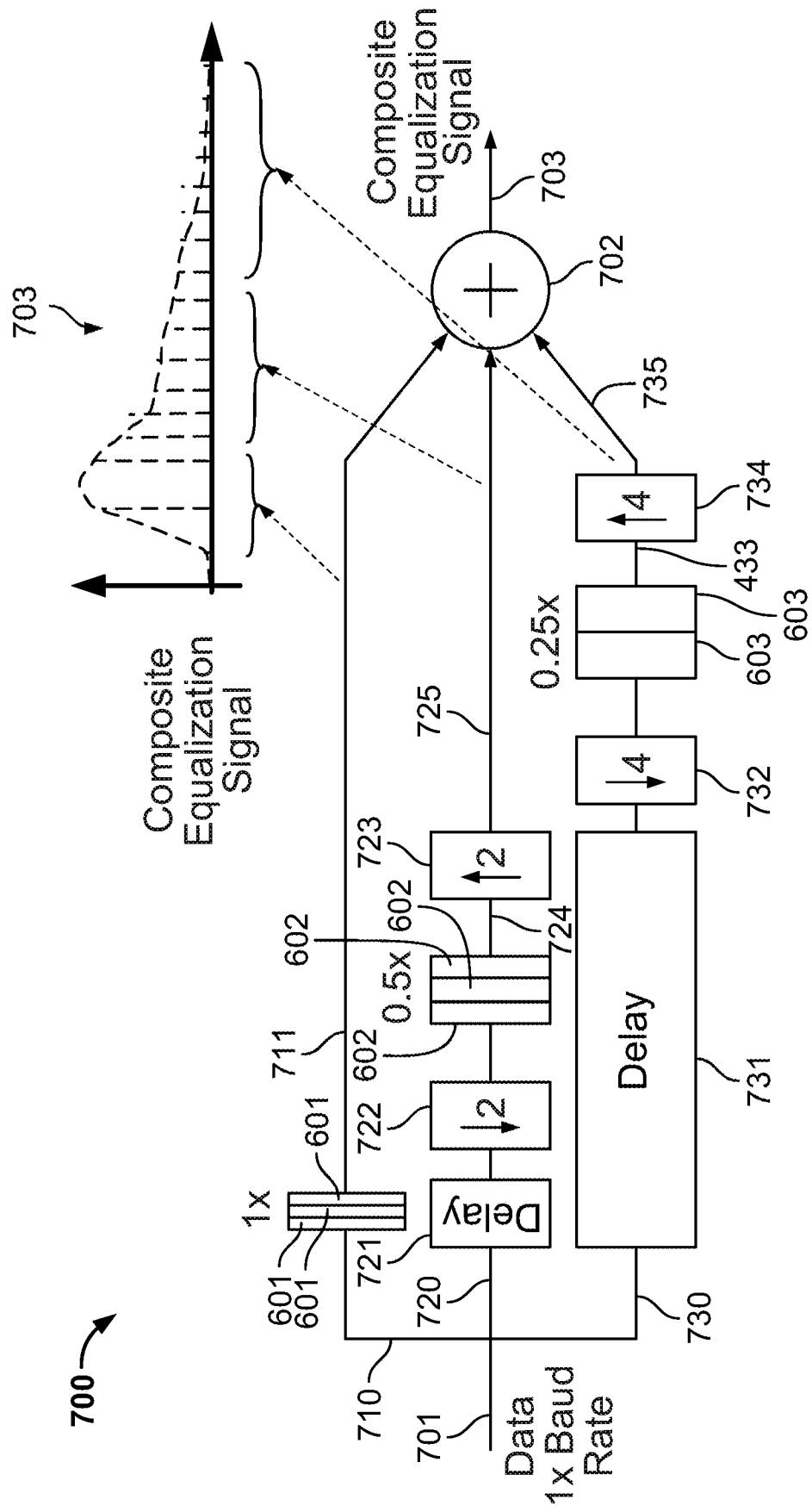
FIG. 7 shows a shows a high-level circuit arrangement of the filter distribution of FIG. 6 in accordance with implementations of the subject matter of this disclosure.
Figure 8:
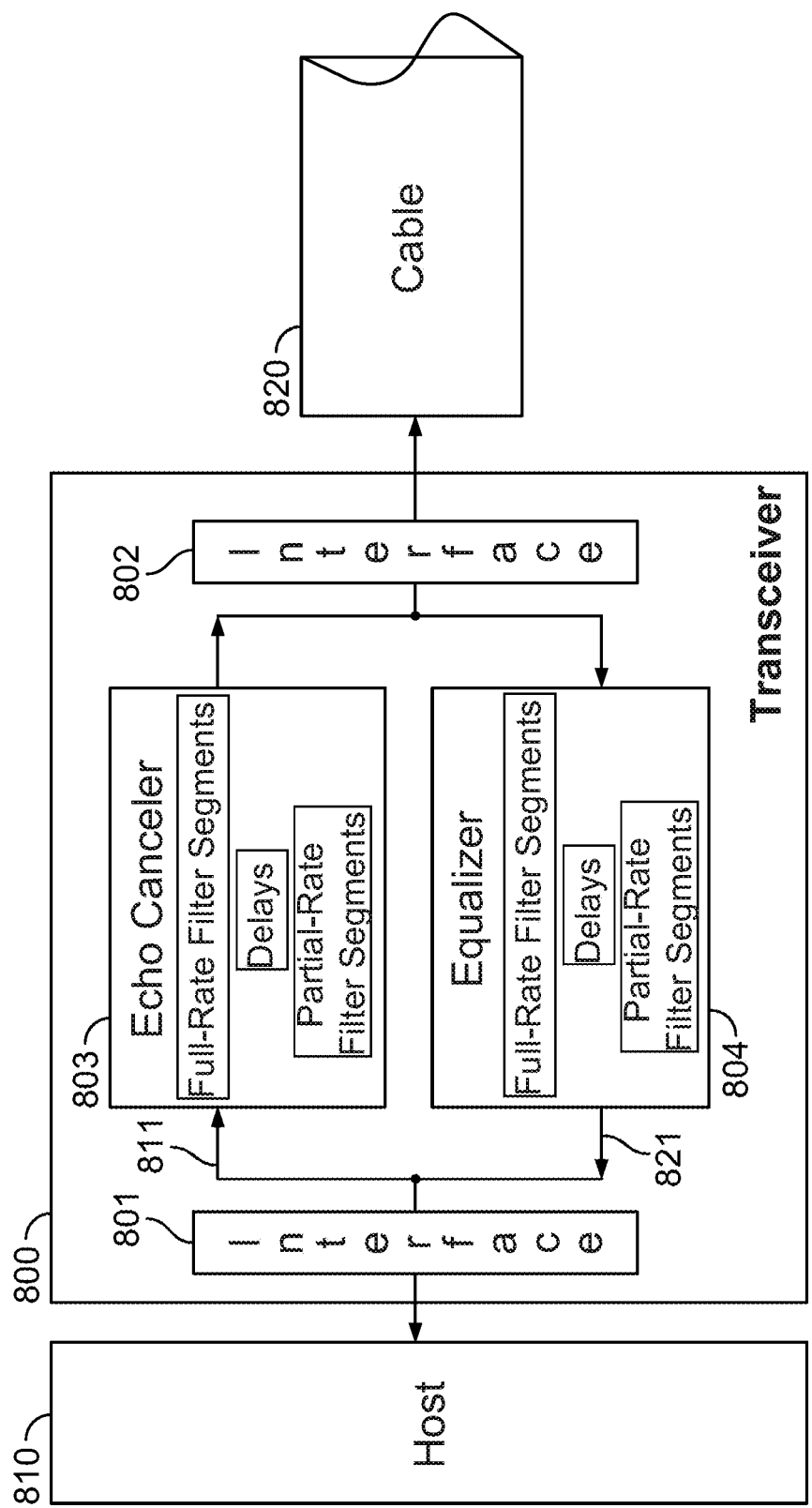
FIG. 8 is a representation of a physical layer transceiver incorporating circuitry such as that of FIGS. 4 and 7, coupled to a host and a wireline medium, in accordance with implementations of the subject matter of this disclosure.

FIGS. 5-7 illustrate equalization in accordance with implementations of the subject matter of this disclosure.

FIG. 5 shows how a signal 500 transmitted from a far-end transmitter is received and spread at 501 at a near-end receiver where it is to be decoded. As seen at 501, signal 500, representing a symbol, spreads temporally into later symbols 512 ("post-cursors") and even into earlier symbols 511 ("precursors"), giving rise to inter-symbol interference (ISI) that complicates decoding of all symbols. Thus, for every symbol represented by a signal 500, the precursors 511 and post-cursors 512 of that signal 500 need to be subtracted by equalization to prevent ISI with neighboring symbols.

Instead of deploying identical filters (which necessarily would all be capable of filtering the highest-frequency components that may be present in any of the precursors 511 or post-cursors 512) to all time slots in the entire duration of spread signal 501 in which a precursor 511 or post-cursor 512 is found, in accordance with implementations of the subject matter of this disclosure, different filters are deployed to different temporal locations based on the frequency content of the precursor 511 or post-cursor 512 in the particular temporal location. Each of the different filters is configured to more closely correspond to the frequency components found in the respective temporal location or slot. The temporal locations are determined by interspersing appropriate delay elements in the filter arrangement.

As seen in FIG. 6, four filter segments 601 are deployed to the temporal interval around main signal 500 including precursors 511 and the initial post-cursors 512, to equalize the signal by subtracting those precursors 511 and initial two post-cursors 512. As indicated by the label "1×," each filter segment 601 is a "full-rate" filter configured to filter signals at the system frequency. Two filter segments 602 are deployed to the temporal interval covered by the next two post-cursors 512. As indicated by the label "0.5×," each filter segment 602 is a "half-rate" filter configured to filter signals at one-half the system frequency and, as shown, covers twice the duration of a full-rate filter. Four filter segments 603 are deployed to the temporal interval covered by remaining post-cursors 512. As indicated by the label "0.25×," each filter segment 603 is a "quarter-rate" filter configured to filter signals at one-quarter the system frequency and, as shown, covers four times the duration of a full-rate filter.

In many implementations, the slower filter segments 602 and 603 consume less power and device area than filter segments 601. Filter segments 602 and 603 are configured for half-rate and quarter-rate operation because it is relatively straightforward to use a series of divide-by-2 circuits to divide the system clock in half and then in half again. Using half-rate filters and quarter-rate filters is sufficient to improve signal-to-noise ratio on the channel without using more expensive full-rate filter segments 601 throughout the duration of the interference, even though the frequency of filter segments 602 and 603 may not exactly match the frequency components of individual ones of post-cursors 512.

In alternative implementations, filter segments 602 and 603 may be more closely matched to the actual frequency composition of individual post-cursors 512. However, such implementations would require detectors capable of analyzing the frequency of the individual post-cursors 512, as well as filters whose frequency of operation is capable of being adjusted.

FIG. 7 shows, in simplified form, a circuit implementation 700 of the equalization filter arrangement of FIG. 6. The data signal from which interfering precursors and post-cursors are to be filtered may be input at 701 and split into three paths 710, 720, 730. Filter segments 601 are deployed in signal path 710 to generate equalization signals to filter the precursors 511 and post-cursors 512 that are near main peak 500, which include the full frequency content of peak 500 and therefore are filtered at the system frequency or baud rate.

Filter segments 602 are deployed in signal path 720, preceded by a delay element 721, sufficient to account for the delay to a next group of post-cursors 512 that have lost some of the higher frequency components due to the low-pass filtering nature of the channel medium, and therefore can be filtered at one-half of the system frequency to generate equalization signals. Because filter segments 602 operate at one-half of the system frequency, downsampling circuitry 722 downsamples the signal on path 720 by a factor of 2 (e.g., by decimation) upstream of filter segments 602. After filtering by filter segments 602, resulting equalization signals 724 are upsampled by a factor of 2 (e.g., by interpolation) by upsampling circuitry 723, back to the system frequency so that upsampled equalization signals 725 can be recombined at 702 with equalization signals 711 on path 710 (as well as upsampled equalization signals 735 on path 730).

Filter segments 603 are deployed in signal path 730, preceded by a delay element 731, sufficient to account for the delay to a next group of post-cursors 512 that have lost more of the higher frequency components due to the low-pass filtering nature of the channel medium, and therefore can be filtered at one-quarter of the system frequency to generate equalization signals. Because filter segments 603 operate at one-quarter of the system frequency, downsampling circuitry 732 downsamples the signal on path 730 by a factor of 4 (e.g., by decimation) upstream of filter segments 603. After filtering by filter segments 603, resulting equalization signals 733 are upsampled by a factor of 4 (e.g., by interpolation) by upsampling circuitry 734, back to the system frequency so that filtered signals 735 can be recombined at 702 with equalization signals 711 on path 710 (as well as upsampled equalization signals 725 on path 720).

Details of composite equalization signal 703 are shown in the inset in the upper right-hand portion of FIG. 7, and show the individual equalization signals needed to subtract out the precursors 511 and post-cursors 512. As in the case of cancellation signals 304 shown in FIGS. 3 and 4, only the absolutes of the equalization signals are shown. Composite equalization signal 703 may be subtracted from input signal 701 to remove precursors 511 and post-cursors 512, and thus the signs would be opposite to what is shown.

There is no equalization signal at the location of peak 500, because nothing is to be subtracted there. The first three equalization signals 741 from path 710 are the outputs of the three filter segments 601 (the number of filter segments will vary depending on the nature of the particular channel being filtered, and generally will appear in greater numbers than are shown here for illustration). The next group of equalization signals 742 from path 720 are the outputs of the three filter segments 601. Because of the 2× upsampling at 723, there are six signals 742, with the second, fourth and sixth signals being respective duplicates interpolated from the first, third and fifth symbols. The next group of equalization signals 743 from path 730 are the outputs of the two filter segments 603. Because of the 4× upsampling at 734, there are eight signals 743, with the second, fourth, sixth and eighth signals being respective duplicates interpolated from the first, third, fifth and seventh symbols. Composite equalization signal 703 may be subtracted from input signal 701 to remove precursors 511 and post-cursors 512 to leave peak 500.

A transceiver 800 (FIG. 8) in accordance with implementations of the subject matter of this disclosure for connecting between a host device 810 and a channel medium such as a cable 820 includes a host interface 801 for coupling to host device 810 and a line interface 802 for coupling to channel medium 820. Transmit path 811 includes an echo canceler 803 such as that described in connection with FIGS. 3 and 4, while receive path 821 includes an equalizer 804, such as that described in connection with FIGS. 6 and 7.

Figure 9:
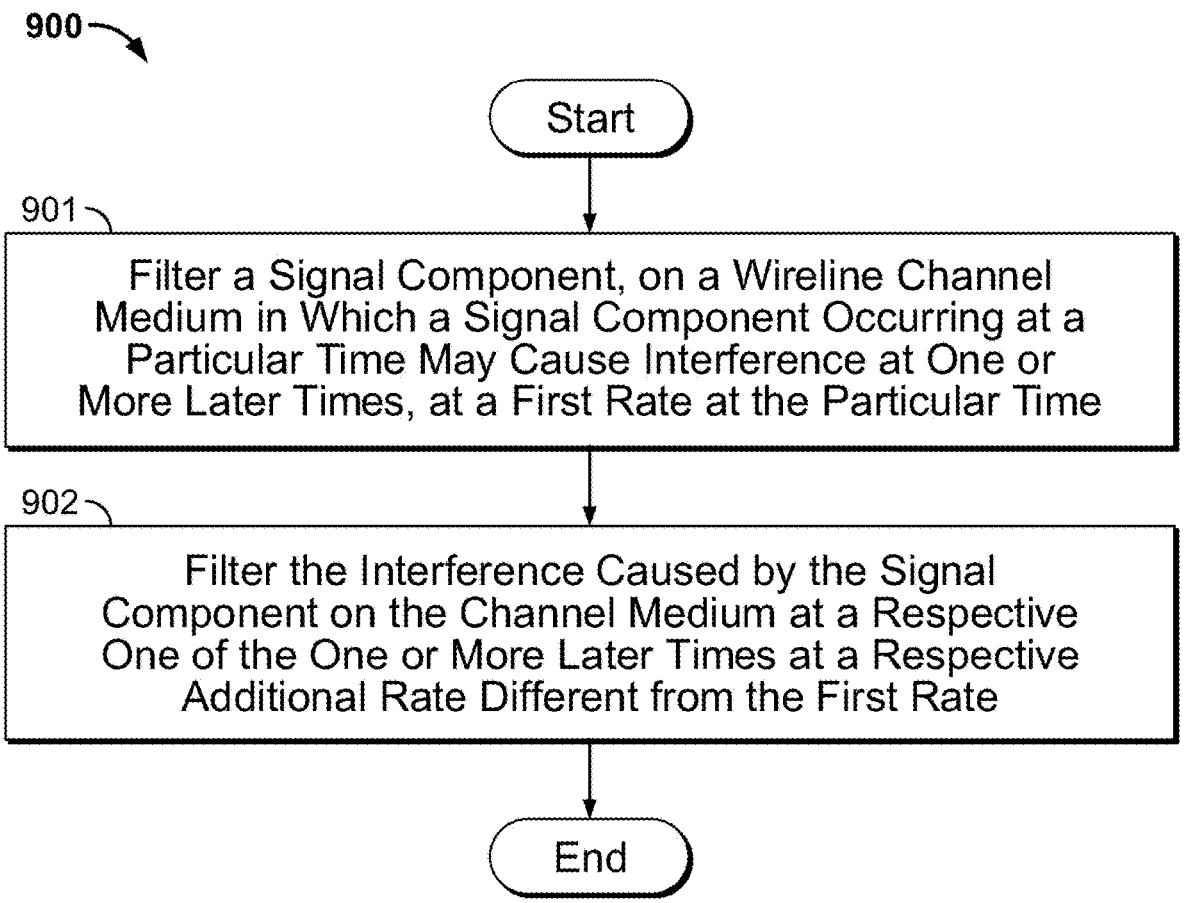
FIG. 9 is a flow diagram illustrating a method of operation in accordance with implementations of the subject matter of this disclosure.

An implementation of a method 900 in accordance with this disclosure is diagrammed in FIG. 9 and begins at 901, where a signal component, on a wireline channel medium in which a signal component occurring at a particular time may cause interference at one or more later times, is filtered at a first rate at the particular time. At 902, the interference caused by the signal component on the channel medium at a respective one of the one or more later times is filtered at a respective additional rate different from the first rate, and method 900 ends.

Thus it is seen that filters for a high-speed data channel, using filter segments having different rates for different portions of the signal on the channel at different times, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for connecting a host device to a wireline channel medium in which a signal component occurring at a particular time may cause interference at one or more other times, the physical layer transceiver comprising:
a host interface for coupling to a host device;
a line interface for coupling to the wireline channel medium; and
filter circuitry operatively coupled to the line interface to filter the interference caused by the signal component at the particular time and at the one or more other times, the filter circuitry comprising:
at least one filter segment configured to operate at a first rate derived from a channel operating frequency to filter the signal component at the particular time, and
at least one respective filter segment configured to operate at a respective additional rate different from the first rate, each of the at least one respective filter segment being coupled to a respective delay element to filter the signal component at a respective one of the one or more other times.

2. The physical layer transceiver of claim 1 wherein each respective additional rate, at which each respective filter segment is configured to operate, is slower than the first rate.

3. The physical layer transceiver of claim 2 wherein:
the at least one respective filter segment configured to operate at a respective additional rate to filter the interference caused by the signal component at a respective one of the one or more later times comprises a plurality of respective filter segments configured to operate at respective additional rates to filter the interference caused by the signal component at respective ones of a plurality of other times; and
the respective additional rate, at a particular respective one of the plurality of other times that is later than another respective one of the plurality of other times, is slower than the respective additional rate at the another respective one of the plurality of other times.

4. The physical layer transceiver of claim 3 wherein:
the plurality of respective filter segments configured to operate at respective additional rates comprises only two respective filter segments;
a first one of the two respective filter segments is configured to operate at one-half the first rate; and
a second one of the two respective filter segments is configured to operate at one-quarter the first rate.

5. The physical layer transceiver of claim 3 wherein the filter circuitry is coupled to a transmit channel of the line interface to filter interference when the signal component is a transmitted signal component.

6. The physical layer transceiver of claim 5 wherein the filter circuitry comprises echo cancellation circuitry configured to cancel an echo of the transmitted signal component.

7. The physical layer transceiver of claim 5 wherein the filter circuitry comprises:
a first path including one filter segment configured to operate at the first rate;
a plurality of respective additional paths, each respective additional path including:
a respective additional filter segment configured to operate at the respective additional rate, and
a respective delay corresponding to a respective one of the plurality of other times; and
circuitry for combining outputs of the first path and the respective additional paths.

8. The physical layer transceiver of claim 7 wherein each one of the respective additional paths further comprises:
downsampling circuitry upstream of the respective filter additional segment; and
upsampling circuitry downstream of the respective filter additional segment.

9. The physical layer transceiver of claim 3 wherein the filter circuitry is coupled to a receive channel of the line interface to filter interference when the signal component is a received signal component.

10. The physical layer transceiver of claim 9 wherein the filter circuitry comprises equalizer circuitry to filter delayed portions of the received signal component from interfering with a later received signal component.

11. The physical layer transceiver of claim 9 wherein the filter circuitry comprises:
a first path including one filter segment configured to operate at the first rate;

a plurality of respective additional paths, wherein:
  a first one of the plurality of respective additional paths is cascaded to output of the one filter segment configured to operate at the first rate, and includes a first respective additional filter segment configured to operate at a first respective additional rate, and
  each subsequent one of the respective additional paths is cascaded to output of the respective additional filter segment in an immediately preceding one of the respective additional paths, and includes a respective subsequent additional filter segment configured to operate at a further respective additional rate; and
  circuitry for combining outputs of the first path and the respective additional paths.

12. The physical layer transceiver of claim 11 wherein each one of the respective additional paths further comprises:
  downsampling circuitry upstream of the respective additional filter segment; and
  upsampling circuitry downstream of the respective additional filter segment.

13. A method of filtering a wireline channel medium in which a signal component occurring at a particular time may cause interference at one or more other times, the method comprising:
  filtering the signal component on the channel medium, using at least one filter segment configured to operate at a first rate derived from a channel frequency, at the particular time; and
  filtering the interference caused by the signal component on the channel medium, at a respective one of the one or more other times, using at least one respective filter segment, each of the at least one respective filter segment being configured to operate at a respective additional rate different from the first rate, and being coupled to a respective delay element.

14. The method of claim 13 for filtering a wireline channel medium, wherein each respective additional rate is slower than the first rate.

15. The method of claim 14 wherein:
  filtering the interference caused by the signal component on the channel medium at a respective one of the one or more other times at a respective additional rate comprises filtering the interference caused by the signal component on the channel medium at only two later times including:
    filtering the interference caused by the signal component on the channel medium at a first later time at one-half the first rate; and
    filtering the interference caused by the signal component on the channel medium at a second later time at one-quarter the first rate.

16. The method of claim 14 for filtering a wireline channel medium, wherein:
  filtering the interference caused by the signal component at the respective one of the one or more other times at a respective additional rate comprises filtering the interference caused by the signal component at a plurality of respective other times at a plurality of respective additional rates; and
  the respective additional rate, at a particular respective one of the plurality of other times that is later than another respective one of the plurality of other times, is slower than the respective additional rate at the another respective one of the plurality of other times.

17. The method of claim 16 for filtering a wireline channel medium, wherein:
  filtering the signal component on the channel medium comprises filtering a transmit component, by:
  filtering a first path at the first rate;
  delaying each of a plurality of respective additional paths by a respective delay corresponding to a respective one of the plurality of other times;
  filtering each of the plurality of the delayed respective additional paths by a respective additional rate; and
  combining outputs of the first path and the respective additional paths.

18. The method of claim 17 for filtering a wireline channel medium, further comprising:
  downsampling each respective one of the plurality of respective additional paths prior to the filtering; and
  upsampling each respective one of the plurality of respective additional paths following the filtering and prior to the combining.

19. The method of claim 16 for filtering a wireline channel medium, wherein:
  filtering the signal component on the channel medium comprises filtering a receive component, by:
  filtering a first path at the first rate;
  cascading a first one of a plurality of respective additional paths to output of the filtering of the first path at the first rate, and filtering the first one of a plurality of respective additional paths at a first respective additional rate;
  cascading each subsequent one of the respective additional paths to output of the respective additional filter segment in an immediately preceding one of the respective additional paths, and filtering each respective subsequent one of the plurality of respective additional paths at a further respective additional rate; and
  combining outputs of the first path and the respective additional paths.

20. The method of claim 19 for filtering a wireline channel medium, further comprising:
  downsampling each respective one of the plurality of respective additional paths prior to the filtering of the respective one of the plurality of respective additional paths; and
  upsampling each respective one of the plurality of respective additional paths following the filtering of the respective one of the plurality of respective additional paths and prior to the combining.

* * * * *